US008462222B2

United States Patent
Maruyama

(10) Patent No.: US 8,462,222 B2
(45) Date of Patent: Jun. 11, 2013

(54) IMAGE PROCESSING METHOD AND DEVICE, AND IMAGING APPARATUS USING THE IMAGE PROCESSING DEVICE

(75) Inventor: Go Maruyama, Kanagawa-ken (JP)

(73) Assignee: Ricoh Company, Limited, Tokyo (JP)

( * ) Notice: Subject to any disclaimer, the term of this patent is extended or adjusted under 35 U.S.C. 154(b) by 287 days.

(21) Appl. No.: 12/976,547

(22) Filed: Dec. 22, 2010

(65) Prior Publication Data

US 2011/0176732 A1    Jul. 21, 2011

(30) Foreign Application Priority Data

Jan. 18, 2010   (JP) ................................. 2010-008185

(51) Int. Cl.
*H04N 5/228*   (2006.01)
(52) U.S. Cl.
USPC ........................................ 348/221.1; 382/275
(58) Field of Classification Search
USPC .................... 348/221.1, 241, 229.1, 234, 362, 348/335; 382/275, 276
See application file for complete search history.

(56) References Cited

U.S. PATENT DOCUMENTS

| | | | | |
|---|---|---|---|---|
| 7,813,585 B2 * | 10/2010 | Higurashi et al. | ............ | 382/275 |
| 7,881,563 B2 * | 2/2011 | Mandy et al. | ................. | 382/300 |
| 8,228,396 B2 * | 7/2012 | Hagiwara | ................... | 348/222.1 |
| 2006/0188172 A1* | 8/2006 | Higurashi et al. | ............ | 382/275 |
| 2007/0188633 A1* | 8/2007 | Mandy et al. | ................. | 348/241 |
| 2009/0002523 A1 | 1/2009 | Maekawa | | |
| 2009/0059040 A1* | 3/2009 | Kamon | ......................... | 348/241 |
| 2009/0225180 A1* | 9/2009 | Maruyama et al. | ........ | 348/222.1 |
| 2009/0238449 A1* | 9/2009 | Zhang et al. | ................... | 382/165 |
| 2010/0246994 A1* | 9/2010 | Sawada | ......................... | 382/275 |
| 2011/0122298 A1* | 5/2011 | Takahashi et al. | ............ | 348/241 |

FOREIGN PATENT DOCUMENTS

| | | |
|---|---|---|
| CN | 1830002 A | 9/2006 |
| JP | 2009-10730 | 1/2009 |
| WO | WO 2007/023715 A1 | 3/2007 |

\* cited by examiner

*Primary Examiner* — Sinh Tran
*Assistant Examiner* — Selam Gebriel
(74) *Attorney, Agent, or Firm* — Dickstein Shapiro LLP

(57) ABSTRACT

The image processing method converts an input image to a transformed image. The method includes segmenting the transformed image into multiple blocks each having multiple pixels including multiple vertex pixels; providing a memory storing at least one coordinate in the transformed image for each vertex pixel, wherein plural coordinates are stored for at least one of the vertex pixels of at least one of the blocks; determining a coordinate in the input image corresponding to a vertex pixel of a focused block by reference to the memory, wherein when plural coordinates are stored for the vertex pixel, one of the coordinates is selected; repeating the determining step for all the blocks to determine coordinates in the input image corresponding to the vertex pixels; and determining coordinates in the input image for all the pixels of the multiple blocks by performing an interpolation processing using the coordinate values determined.

11 Claims, 14 Drawing Sheets

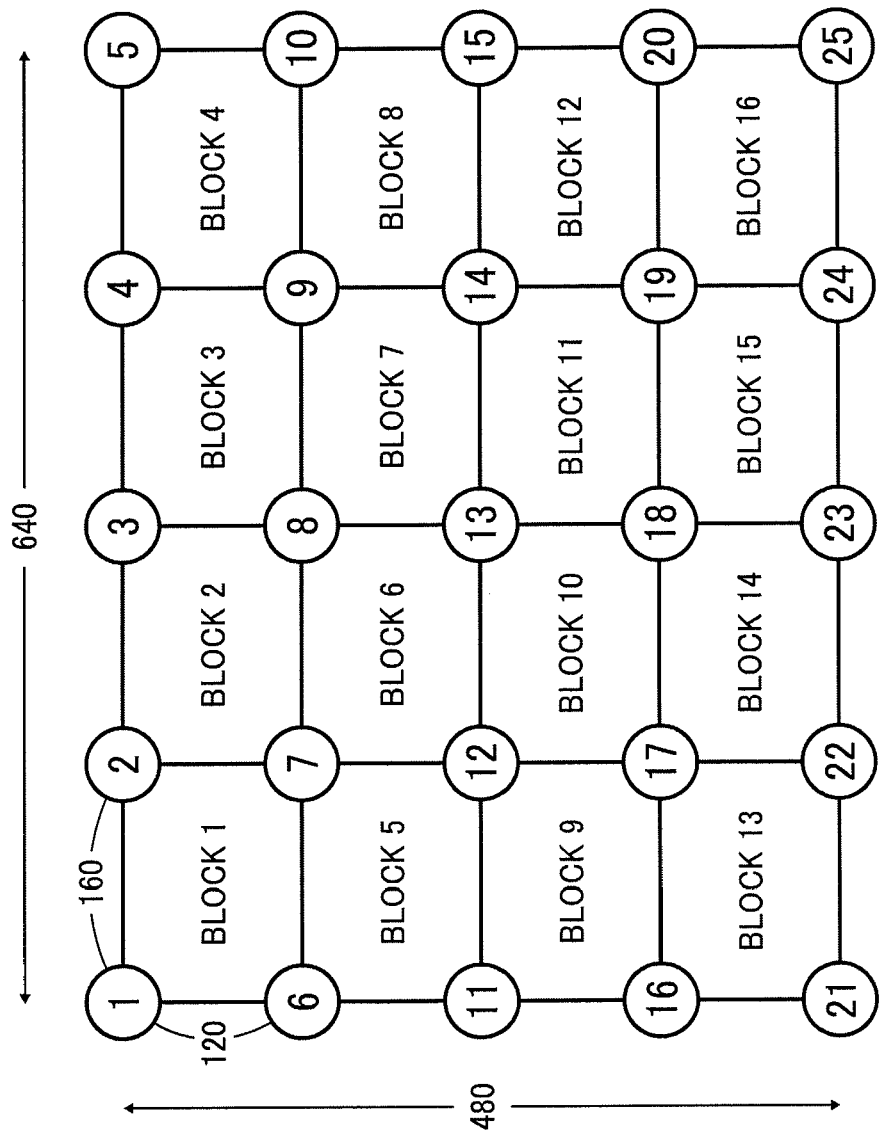

FIG. 6

| ADDRESS | X-COORDI-NATE | Y-COORDI-NATE | UPPER LEFT FLAG | UPPER RIGHT FLAG | LOWER LEFT FLAG | LOWER RIGHT FLAG | NEXT ADDRESS |
|---|---|---|---|---|---|---|---|
| 1 | X1 | Y1 | 0 | 0 | 0 | 0 | – |
| 2 | X2 | Y2 | 0 | 0 | 0 | 0 | – |
| 3 | X3 | Y3 | 1 | 0 | 0 | 0 | 26 |
| 4 | X11 | Y11 | 0 | 0 | 0 | 0 | – |
| 5 | X12 | Y12 | 0 | 0 | 0 | 0 | – |
| 6 | X4 | Y4 | 0 | 0 | 0 | 0 | – |
| 7 | X5 | Y5 | 0 | 0 | 0 | 0 | – |
| 8 | X6 | Y6 | 1 | 0 | 1 | 0 | 27 |
| 9 | X14 | Y14 | 0 | 0 | 0 | 0 | – |
| 10 | X15 | Y15 | 0 | 0 | 0 | 0 | – |
| 11 | X7 | Y7 | 1 | 1 | 0 | 0 | 29 |
| 12 | X8 | Y8 | 1 | 1 | 0 | 0 | 30 |
| 13 | X9 | Y9 | 1 | 1 | 1 | 0 | 28 |
| 14 | X17 | Y17 | 1 | 1 | 0 | 0 | 33 |
| 15 | X18 | Y18 | 1 | 1 | 0 | 0 | 34 |
| 16 | X22 | Y22 | 0 | 0 | 0 | 0 | – |
| 17 | X23 | Y23 | 0 | 0 | 0 | 0 | – |
| 18 | X24 | Y24 | 1 | 0 | 1 | 0 | 35 |
| 19 | X32 | Y32 | 0 | 0 | 0 | 0 | – |
| 20 | X33 | Y33 | 0 | 0 | 0 | 0 | – |
| 21 | X25 | Y25 | 0 | 0 | 0 | 0 | – |
| 22 | X26 | Y26 | 0 | 0 | 0 | 0 | – |
| 23 | X27 | Y27 | 1 | 0 | 1 | 0 | 36 |
| 24 | X35 | Y35 | 0 | 0 | 0 | 0 | – |
| 25 | X36 | Y36 | 0 | 0 | 0 | 0 | – |
| 26 | X10 | Y10 | 0 | 0 | 0 | 0 | – |
| 27 | X13 | Y13 | 0 | 0 | 0 | 0 | – |
| 28 | X16 | Y16 | 1 | 1 | 0 | 0 | 31 |
| 29 | X19 | Y19 | 0 | 0 | 0 | 0 | – |
| 30 | X20 | Y20 | 0 | 0 | 0 | 0 | – |
| 31 | X21 | Y21 | 1 | 0 | 0 | 0 | 32 |
| 32 | X28 | Y28 | 0 | 0 | 0 | 0 | – |
| 33 | X29 | Y29 | 0 | 0 | 0 | 0 | – |
| 34 | X30 | Y30 | 0 | 0 | 0 | 0 | – |
| 35 | X31 | Y31 | 0 | 0 | 0 | 0 | – |
| 36 | X34 | Y34 | 0 | 0 | 0 | 0 | – |

FIG. 12

| ADDRESS | X-COORDI-NATE | Y-COORDI-NATE | UPPER LEFT FLAG | UPPER RIGHT FLAG | LOWER LEFT FLAG | LOWER RIGHT FLAG | NEXT ADDRESS |
|---|---|---|---|---|---|---|---|
| 1 | X1 | Y1 | 0 | 0 | 0 | 0 | - |
| 2 | X2 | Y2 | 0 | 0 | 0 | 0 | - |
| 3 | X3 | Y3 | 0 | 0 | 0 | 0 | - |
| 4 | X4 | Y4 | 0 | 0 | 0 | 0 | - |
| 5 | X5 | Y5 | 0 | 0 | 0 | 0 | - |
| 6 | X6 | Y6 | 0 | 0 | 0 | 0 | - |
| 7 | X7 | Y7 | 1 | 0 | 0 | 0 | 26 |
| 8 | X8 | Y8 | 0 | 1 | 0 | 0 | 27 |
| 9 | X9 | Y9 | 0 | 0 | 0 | 0 | - |
| 10 | X10 | Y10 | 0 | 0 | 0 | 0 | - |
| 11 | X11 | Y11 | 0 | 0 | 0 | 0 | - |
| 12 | X12 | Y12 | 0 | 0 | 1 | 0 | 28 |
| 13 | X13 | Y13 | 0 | 0 | 0 | 1 | 29 |
| 14 | X14 | Y14 | 0 | 0 | 0 | 0 | - |
| 15 | X15 | Y15 | 0 | 0 | 0 | 0 | - |
| 16 | X16 | Y16 | 0 | 0 | 0 | 0 | - |
| 17 | X17 | Y17 | 0 | 0 | 0 | 0 | - |
| 18 | X18 | Y18 | 0 | 0 | 0 | 0 | - |
| 19 | X19 | Y19 | 0 | 0 | 0 | 0 | - |
| 20 | X20 | Y20 | 0 | 0 | 0 | 0 | - |
| 21 | X21 | Y21 | 0 | 0 | 0 | 0 | - |
| 22 | X22 | Y22 | 0 | 0 | 0 | 0 | - |
| 23 | X23 | Y23 | 0 | 0 | 0 | 0 | - |
| 24 | X24 | Y24 | 0 | 0 | 0 | 0 | - |
| 25 | X25 | Y25 | 0 | 0 | 0 | 0 | - |
| 26 | X26 | Y26 | 0 | 0 | 0 | 0 | - |
| 27 | X27 | Y27 | 0 | 0 | 0 | 0 | - |
| 28 | X28 | Y28 | 0 | 0 | 0 | 0 | - |
| 29 | X29 | Y29 | 0 | 0 | 0 | 0 | - |

OUTPUT IMAGE

CAPTURED IMAGE (INPUT IMAGE)

IMAGE PROCESSING METHOD AND DEVICE, AND IMAGING APPARATUS USING THE IMAGE PROCESSING DEVICE

BACKGROUND OF THE INVENTION

1. Field of the Invention

The present invention relates to an image processing method and an image processing device for performing an image transformation operation, and to an imaging apparatus using the image processing device.

2. Description of the Related Art

When an image transformation operation such as correction of a distorted image, rotation of an image, and change of an image to an overhead view is performed in conventional camera systems such as in-vehicle cameras, a method using a lookup table in which relation between coordinate values of pixels of an input image and coordinate values of pixels of an output image is preliminarily stored is used to perform the image transformation operation at a high speed. However, since recent image sensors have a great number of pixels, a memory having a large memory capacity has to be used for storing such a lookup table. In addition, it is necessary to prepare a lookup table for each image transformation operation. Since a variety of image transformation operations are needed recently, the number of lookup tables used increases, thereby increasing the costs of the camera systems.

In attempting to solve the problem, there is a proposal for an image processing method of transforming an input image to an output image using a lookup table, wherein the output image is segmented into multiple blocks, and coordinate values of pixels of the input image corresponding to vertex pixels of each of the multiple blocks constituting the output image are stored in the lookup table. When a coordinate value of a pixel of the input image corresponding to a focused pixel of the output image are not present on the lookup table, the coordinate values are calculated using a bilinear interpolation processing to decrease the size of memory for storing the lookup table, and to perform a variety of image transforming operations at a high speed using a device having a simple configuration.

In the method, for example, when it is desired that a portion of a captured image (i.e., input image) is displayed while enlarged (i.e., when digital zooming is performed), the output image is segmented into multiple blocks (e.g., 6×4 blocks in an image illustrated in FIG. 13), each of which has pixels of (a) pieces in the X-direction and pixels of (b) pieces in the Y-direction as illustrated in FIG. 13. In addition, the method uses a lookup table, in which coordinate values of pixels in the input image corresponding to vertex pixels of each block of the output image (e.g., 7×5 vertex pixels in the image illustrated in FIG. 13) are stored. In FIG. 13, reference numerals 1-35 denote the numbers of the vertex pixels (hereinafter referred to as a vertex pixel number) of the output image. The coordinate value of a pixel in the input image corresponding to one of the vertex pixels of the output image is stored in the lookup table.

When a focused pixel of the output image is identical to one of the vertex pixels, the coordinate value of the corresponding pixel of the input image stored at an address in the lookup table, which has the number of the one of the vertex pixels, is used. By contrast, when the focused pixel of the output image is not identical to each of the vertex pixels, the coordinate values of four vertex pixels of the input image corresponding to four vertex pixels of one of the blocks including the focused pixel are obtained from the lookup table, and the coordinate values of a pixel in the input image corresponding to the focused pixel in the output image are calculated by performing a linear interpolation processing using the coordinate values of the four vertex pixels. In this regard, the corresponding pixel of the input image is output as the focused pixel of the output image. When there is no pixel in the input image corresponding to the focused pixel of the output image, the pixel value of the focused pixel in the output image is determined by performing a linear interpolation processing on four pixels surrounding a point having the determined coordinate values.

By using the image processing method mentioned above, complex image transformation processings (such as digital zooming images illustrated in FIG. 13) can be realized using a small-sized lookup table. However, it is not easy for the image processing method to output a picture by picture (P by P) image, for example, by displaying both side portions of a captured image side by side (such as an image illustrated in FIG. 14B), because there is a discontinuous portion in the center of the output image. In addition, it is not easy for the image processing method to output a picture in picture (P in P) image, in which a second image is displayed in a first image, because there is a discontinuous portion at the boundary between the first and second images.

FIG. 14A is a schematic view illustrating a captured image, and FIG. 14B is a schematic view illustrating a picture by picture image prepared by using the captured image. Specifically, a portion A on the left side of the captured image illustrated in FIG. 14A and a portion B on the right side of the captured image are displayed side by side while enlarged (i.e., digital zooming) as illustrated in FIG. 14B. In this regard, the number of blocks (6×4 blocks) of the output image is the same as that in the output image illustrated in FIG. 13B. It can be understood from comparison of FIG. 14 with FIG. 13 that since the number of vertex data to be referred to at the discontinuous portion (i.e., the central portion) in the image illustrated in FIG. 14B is greater than that in the image illustrated in FIG. 13B, the number of vertex points whose information is stored in a lookup table is greater than that in the image illustrated in FIG. 13B. Specifically, in the image illustrated in FIG. 13B, the number of vertex points whose information is stored in a lookup table is 35 (i.e., 7×5) whereas the number of vertex points whose information is stored in a lookup table is 40 (i.e., 4×5+4×5) in the image illustrated in FIG. 14B. In a method of calculating coordinate values of pixels in an input image corresponding to pixels in an output image by performing a linear interpolation processing using a lookup table, it is necessary to perform complex processings at a discontinuous portion. Namely, it is not easy for the method to perform such complex processings.

For these reasons, the present inventor recognized that there is a need for an image processing method, by which coordinate values of pixels in an input image corresponding to pixels in an output image can be easily obtained by performing a linear interpolation processing or the like using a lookup table even when the output image has a discontinuous portion.

SUMMARY

This patent specification describes a novel image processing method for converting an input image to a transformed output image constituted of multiple pixels, one embodiment of which includes:

segmenting the transformed output image into multiple blocks each having multiple pixels including multiple vertex pixels;

providing a vertex data memory storing at least one coordinate value in the output image for each of the multiple vertex pixels of each of the multiple blocks, wherein two or more coordinate values are stored for at least one of the multiple vertex pixels of at least one of the multiple blocks;

determining a coordinate value in the input image corresponding to one of the multiple vertex pixels of a focused block of the multiple blocks by reference to the vertex data memory, wherein when two or more coordinate values are stored for the one of the vertex pixels, one of the multiple coordinate values is selected;

repeating the coordinate value determining step for all of the multiple blocks to determine coordinate values in the input image corresponding to the multiple vertex pixels of the multiple blocks of the transformed output image; and determining coordinate values in the input image for all of the multiple pixels of the multiple blocks by performing an interpolation processing using the coordinate values for all of the multiple vertex pixels of the multiple blocks.

This patent specification further describes a novel image processing device for converting an electric input image to a transformed output image consisting of multiple pixels, one embodiment of which includes:

an A/D converter configured to convert the electric input image to digital image data;

an image buffer configured to store the digital image data;

a synchronization signal generator configured to generate horizontal synchronization signal, a vertical synchronization signal and a clock signal;

an image transformer configured to determine coordinate values in the input image corresponding to all of the multiple pixels of the transformed output image using the image processing method mentioned above; and an image reader configured to read the digital image data stored in the image buffer by reference to the coordinate values determined by the image processing device to form the transformed output image.

This patent specification further describes a novel imaging apparatus for converting an optical image to a transformed output image, one embodiment of which includes:

an imaging sensor configured to convert the optical image to analogue electric signals; and the image processing device mentioned above configured to convert the analogue electric signals to the transformed output image.

BRIEF DESCRIPTION OF THE DRAWINGS

A more complete appreciation of aspects of the invention and many of the attendant advantage thereof will be readily obtained as the same become better understood by reference to the following detailed description when considered in connection with the accompanying drawings, wherein:

FIG. 4 is a schematic view illustrating an example of an output image which is segmented into multiple blocks;

FIG. 6 illustrates a lookup table stored in the vertex data memory illustrated in FIG. 2, which is used for producing the P by P image illustrated in FIG. 5B;

FIG. 12 is a lookup table stored in the vertex data memory illustrated in FIG. 2, which is used for producing the P in P image illustrated in FIG. 11B;

DESCRIPTION OF THE PREFERRED EMBODIMENTS

Initially, an embodiment of the image processing method of the present invention will be described by reference to drawings.

Figure 1:
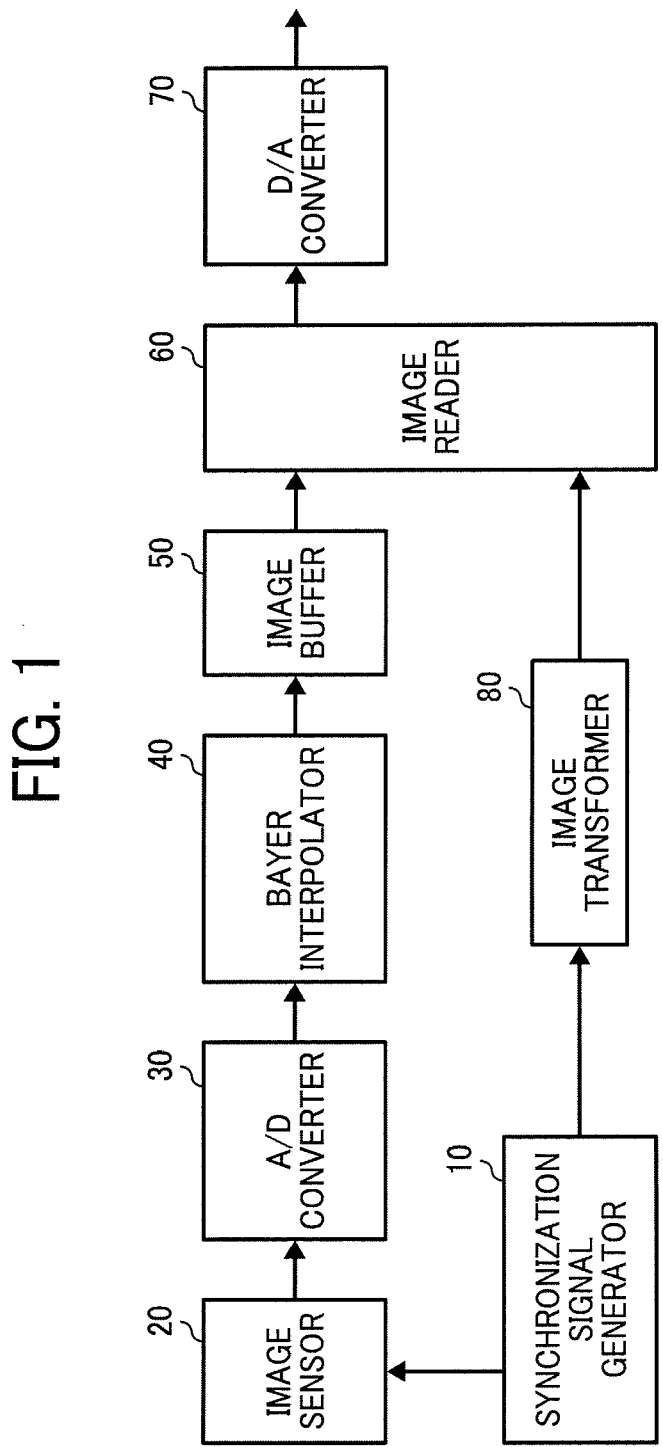
FIG. 1 is a block diagram illustrating an embodiment of the imaging apparatus of the present invention using the image processing method of the present invention.

FIG. 1 is a block diagram illustrating an embodiment of the imaging apparatus of the present invention using the image processing method of the present invention. The imaging apparatus includes not only the devices illustrated in FIG. 1, but also an operation portion configured to issue an order, an image display configured to display an image, and a controller configured to control the operations of these devices, which are not shown in FIG. 1.

Referring to FIG. 1, the imaging apparatus includes a synchronization signal generator 10 generating a horizontal synchronization signal, a vertical synchronization signal and a clock signal for use in operating the devices of the imaging apparatus. These synchronization signals and clock signal are sent to an image sensor 20 and an image transformer 80.

An image sensor 20 is configured to convert an optical image obtained by an optical system (not shown) to electric signals (i.e., image signals), and includes a device such as a CCD sensor and a CMOS sensor. The image sensor 20 includes color filters arranged in a Bayer arrangement, and sequentially outputs RGB image signals according to horizontal/vertical synchronization signals and a clock signal output from the synchronization signal generator 10.

An A/D converter 30 converts the RGB analog signals output from the image sensor 20 to digital image signals and sends the digital image signals to a Bayer interpolator 40. In this regard, image data of one pixel (i.e., one pixel data) are constituted of 8 bits for each of the RGB colors. In this regard, an AGC circuit configured to amplify an image signal output from the image sensor 20 so as to be a predetermined value is typically provided before the A/D converter 30, but is not illustrated in FIG. 1.

The Bayer interpolator 40 generates image data of the RGB colors of all the pixels on the coordinate plane by performing a linear interpolation processing on each of the digital Bayer-arrangement RGB image data sent from the A/D converter 30 and sends the image data to an image buffer 50.

The image buffer 50 temporarily stores the image data sent from the Bayer interpolator 40. The image buffer 50 includes a frame buffer memory such as DRAMs, so that image data of one or more images (frames) (i.e., original captured image) are stored therein.

An image reader 60 performs raster scanning on the image buffer 50 (frame buffer memory) while being synchronized with the horizontal/vertical synchronization signals and clock signal to sequentially read out the image data (pixel data) from the image buffer 50. Specifically, the image reader 60 receives an X-coordinate value and a Y-coordinate value of a pixel of an output image from an image transformer 80 mentioned below in synchronization with the horizontal/vertical synchronization signals and clock signal, and sequentially calculates the address of each pixel of the input image (i.e., address of a pixel before coordinate conversion) stored in the image buffer 50 on the basis of the X- and Y-coordinate data of the output image sent from the image transformer 80 to read out the image data (pixel data) of the pixel at the thus determined address in the image buffer. As a result, the image reader 60 outputs a transformed image of the original image stored in the image buffer 50.

AD/A converter 70 converts the digital image signals output from the image reader 60 to analog image signals suitable for displaying the image in a displaying device used (not shown). For example, the digital image signals output from the image reader 60 are converted to NTSC image signals. The D/A converter 70 is connected with such a displaying device via a cable or the like so that the image is displayed in the display according to the image signals.

The image transformer 80 receives the horizontal/vertical synchronization signals and clock signal from the synchronization signal generator 10 and calculates the X- and Y-coordinate values of a pixel of the input image before coordinate conversion, which is a basis for the address of the pixel and which is used when the image reader reads out the image data from the image buffer 50, and sequentially outputs the X- and Y-coordinate data, which are synchronized with the horizontal/vertical synchronization signals and clock signal. Since the present invention relates to the image transformer 80, the image transformer will be described later in detail.

In this regard, when the image buffer 50 can store image data of at least two images, it becomes possible for the image buffer to perform the writing and reading operations using a double buffering method. In a double buffering method, image data of a current frame are written in a memory area while reading out the image data of a former frame, and this operation is repeated for each frame. By using such a double buffering method, a high speed processing can be performed.

Next, the image transformer 80, which is a main portion of the imaging apparatus of the present invention, will be described in detail.

Figure 2:
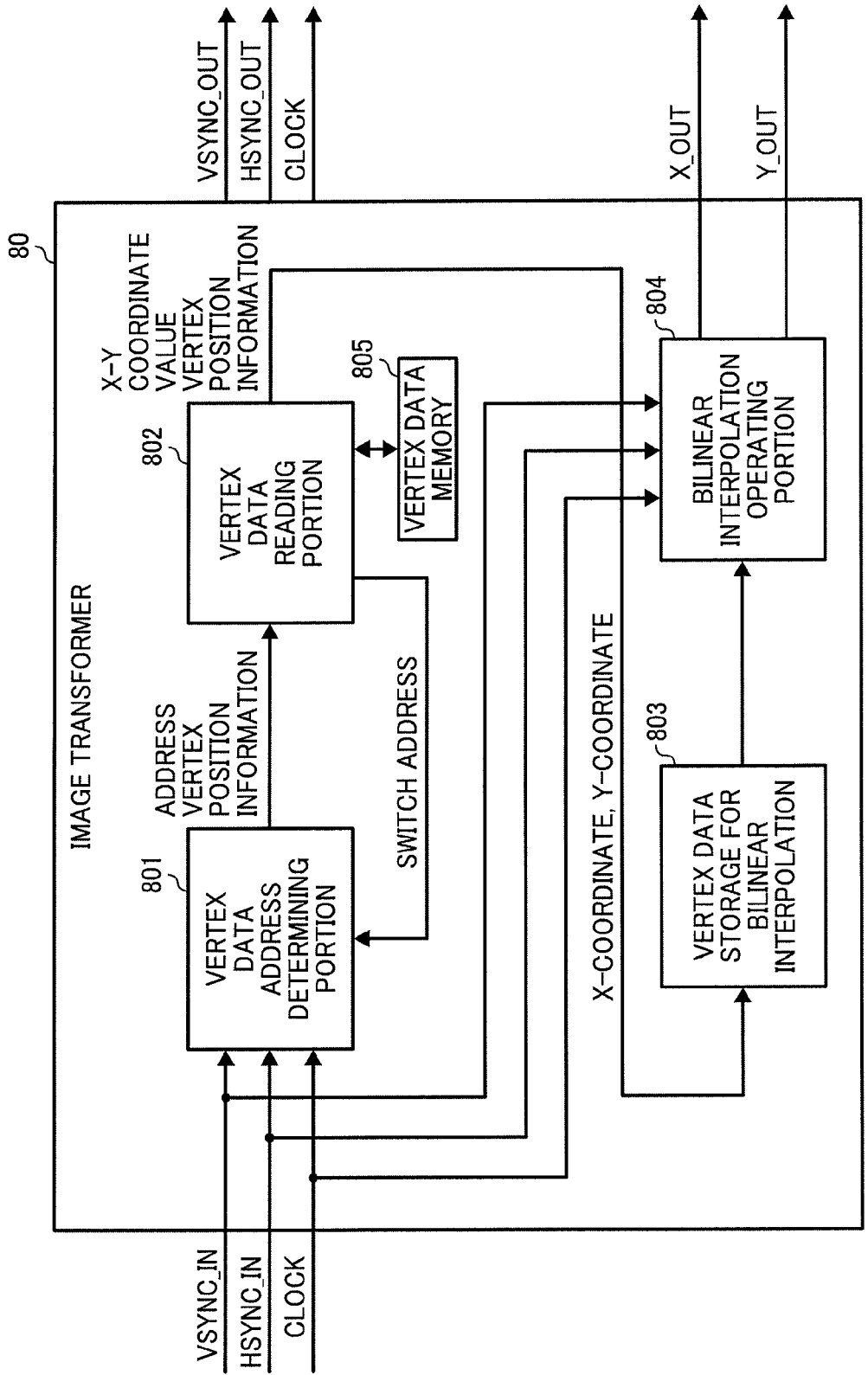
FIG. 2 is a block diagram illustrating an image transformer for use in the imaging apparatus illustrated in FIG. 1.

FIG. 2 is a block diagram illustrating the configuration of the image transformer 80. Referring to FIG. 2, the image transformer 80 includes a vertex data address determining portion 801, a vertex data reading portion 802, a vertex data storage 803 for bilinear interpolation serving as a vertex data memory for bilinear interpolation operation, a bilinear interpolation operating portion 804, and a vertex data memory 805 serving as a lookup table.

The image transformer 80 receives a vertical synchronization signal VSYNC_IN, a horizontal synchronization signal HSYNC_IN, and a clock signal from the synchronization signal generator 10, and outputs a signal VSYNC_OUT, a signal HSYNC_OUT, a clock signal, a signal X-OUT and a signal Y-OUT.

The vertical synchronization signal VSYNC_IN is used for determining the scanning timing in the vertical direction in the imaging apparatus of the present invention, and the horizontal synchronization signal HSYNC_IN is used for determining the scanning timing in the horizontal direction. These signals are sent from the synchronization signal generator 10 together with the clock signal. The signals VSYNC_OUT and HSYNC_OUT are delayed signals of the signals VSYNC_IN and HSYNC_IN delayed for a predetermined period of time. The X_OUT and Y_OUT are signals of the X-coordinate value and Y-coordinate value for use in determining the address used when the image reading portion 60 reads out the image data from the image buffer 50, wherein the X_OUT is a signal of the X-coordinate value of a pixel of an input image (before coordinate conversion) and Y_OUT is a signal of the Y-coordinate value of a pixel of the input image (before coordinate conversion). The X_OUT and Y_OUT are output while synchronized with the signals VSYNC_OUT and HSYNC_OUT.

Figure 3A:
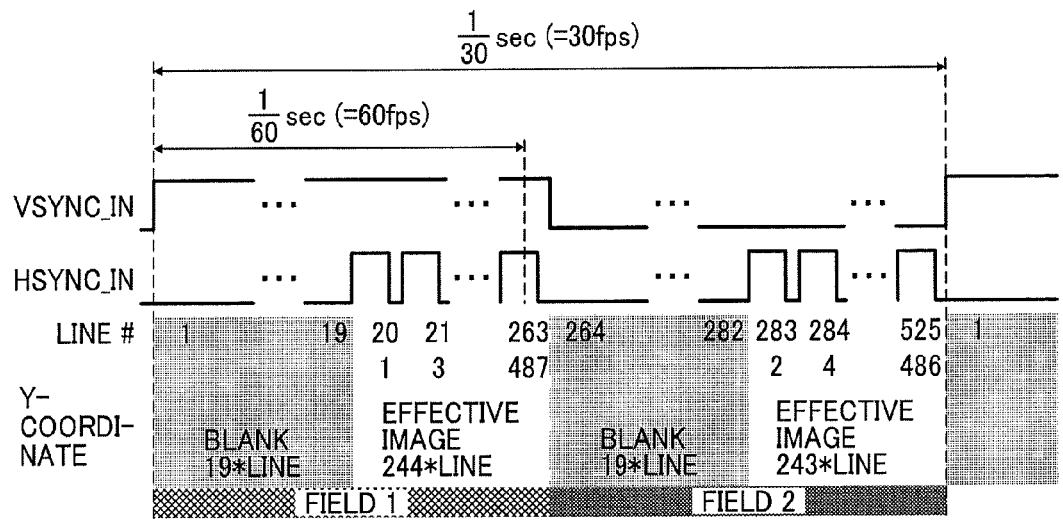
FIGS. 3A and 3B are timing charts illustrating relations between a vertical synchronization signal, a horizontal synchronization signal and a block start signal.
Figure 3B:
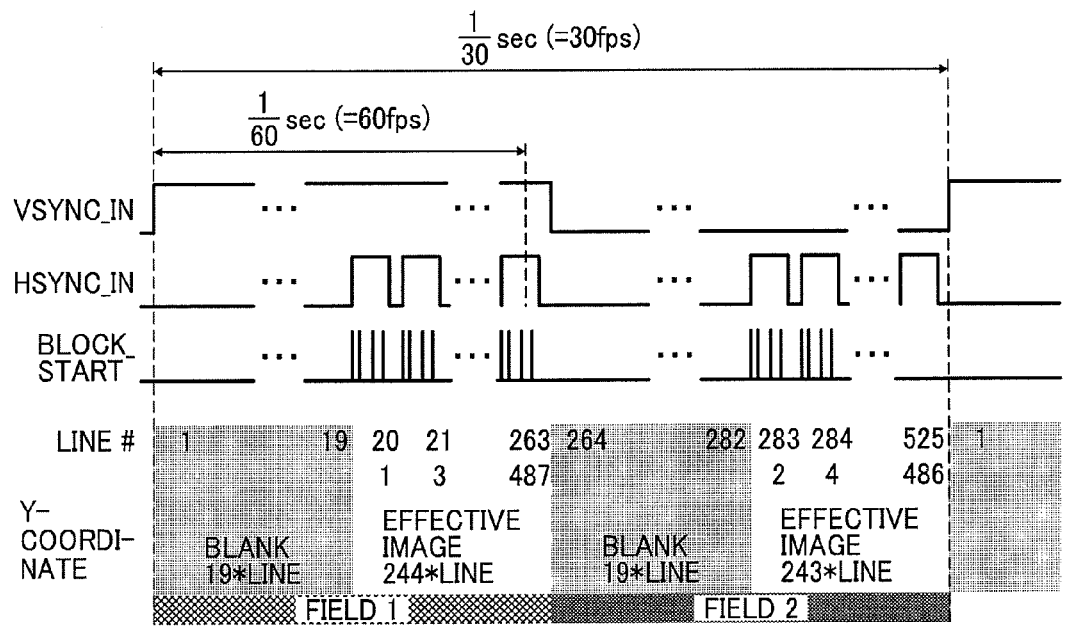

FIG. 3A is a timing chart of the signals VSYNC_IN and HSYNC_IN. FIG. 3 illustrates an example of the interlace scanning method, and the progressive scanning method can also be used. The coordinates of a pixel of an output image can be unambiguously determined by counting the number of edge up and edge down of the signal VSYNC_IN (i.e., change of the signal from LOW to HIGH or vice versa), the number of rising edges of the signal HSYNC_IN, and the number of clock signals. Therefore, by preliminarily calculating the amount of delay of the signals VSYNC_OUT and HSYNC_OUT, and X_OUT and Y-OUT against the signals VSYNC_IN and HSYNC_IN, the coordinates of a pixel of the input image corresponding to the coordinates of a pixel of the output image can be determined.

In this example, the size of the input image stored in the image buffer 50 is 640×480, and the output image is segmented into multiple blocks each having a size (a) of 160 in the X-direction (i.e., horizontal scanning direction) and a size (b) of 120 in the Y-direction (i.e., vertical scanning direction). FIG. 4 illustrates the numbers of blocks and vertex pixels of the output image. Referring to FIG. 4, the output image has a size of 640×480, and is segmented into 16 blocks. The numbers of 1 to 25 are assigned to the vertex pixels. Hereinafter a vertex pixel is sometimes referred to as a vertex.

Referring back to FIG. 2, the vertex data memory 805 stores the X-coordinate value and Y-coordinate value of a pixel of an input image corresponding to each of the vertexes of each block. In this regard, data of a discontinuous portion of a P by P or P in P image are stored at different addresses.

Figure 5A:
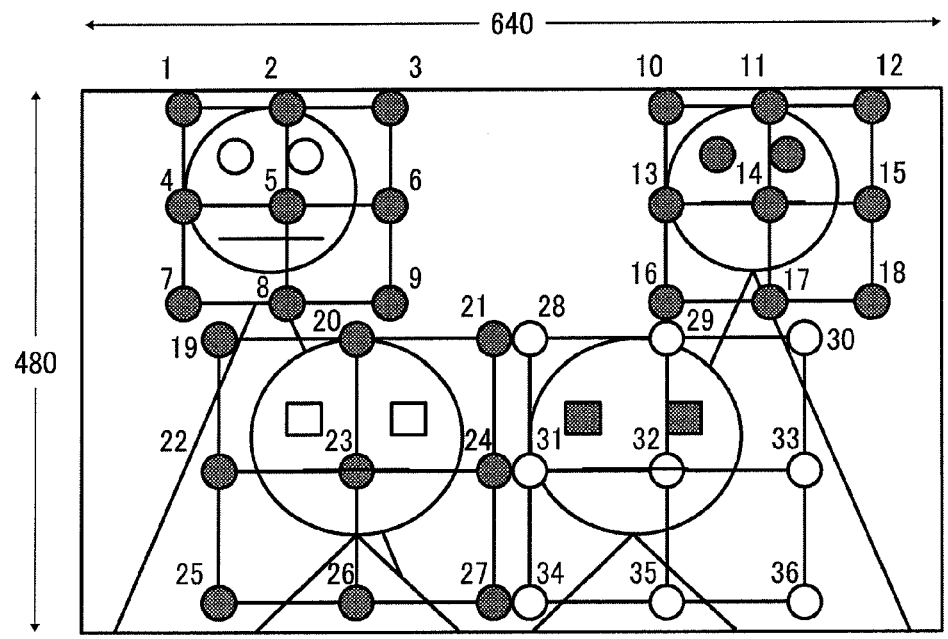
FIG. 5A is a schematic view illustrating an input image.
Figure 5B:
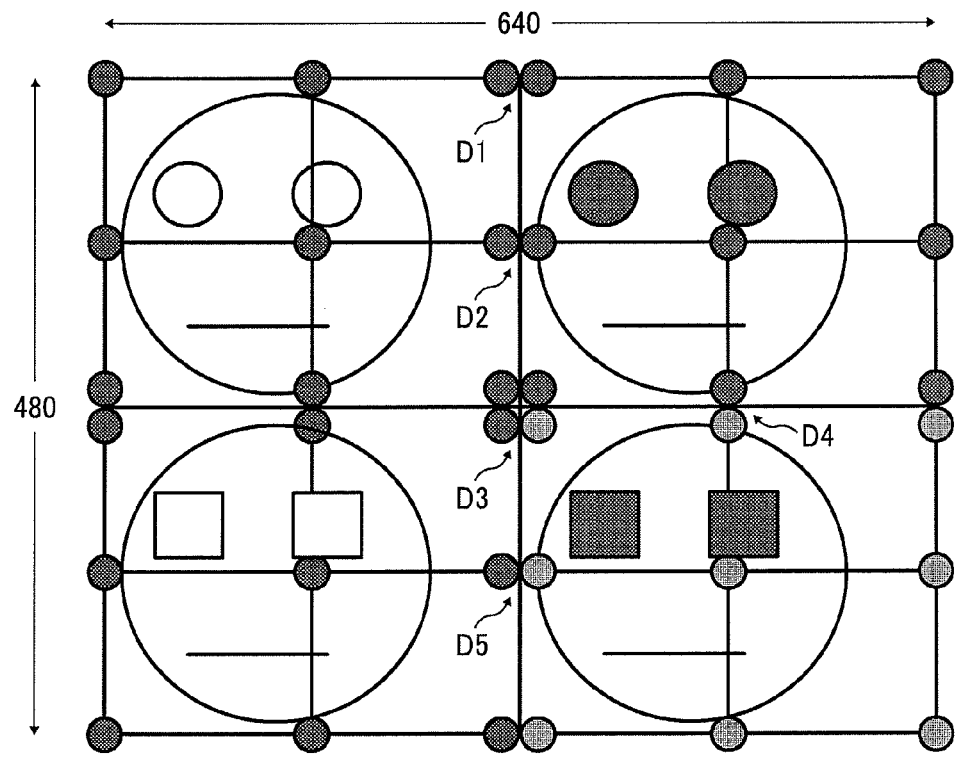
FIG. 5B is a schematic view illustrating a P by P image prepared from the input image illustrated in FIG. 5A.

FIG. 5A is a schematic view illustrating an input image, and FIG. 5B is a schematic view illustrating a P by P image to be prepared from the input image illustrated in FIG. 5A. The output image consists of four image portions of the input image. FIG. 6 illustrates a lookup table stored in the vertex data memory 805 and used for producing the P by P image illustrated in FIG. 5B. In FIG. 6, addresses 1-25 correspond to the numbers 1-25 of the vertexes illustrated in FIG. 4. Addresses 26-36 are used for storing data of overlapping vertexes at the discontinuous portion. The X-coordinate and Y-coordinate in the table mean the X-coordinate value and Y-coordinate value of a pixel of the input image corresponding to a vertex, and the number (i) of Xi and Yi in the table means the number (1-36) assigned to the vertexes of the input image illustrated in FIG. 5A. Since the image size is 640×480 in this example, the X-coordinate value is from 1 to 640 and the Y-coordinate value is from 1 to 480. If the vertex data memory 805 has an excess capacity, the X-coordinate value and Y-coordinate value are not necessarily integers. The upper left flag, upper right flag, lower left flag and lower right flag will be described later. One of the features of the present invention is the data construction of the vertex data memory 805.

Referring to FIG. 2, the vertex data address determining portion 801 receives the signals VSYNC_IN and HSYNC_IN and the clock signal sent from the synchronization signal generator 10, and a switch address sent from the vertex data reading portion 802, and determines the address in the vertex data memory 805 to obtain the data of the four vertexes of a focused block of an output image. The vertex data address determining portion 801 sends the thus determined address to the vertex data reading portion 802 together with the vertex position information. For example, when the focused block is the block 1, the addresses 1, 2, 6 and 7 corresponding to the numbers 1, 2, 6 and 7 of the vertexes of the block 1 (illustrated in FIG. 4) are determined. With respect to the vertex position information, numbers 1, 2, 3 and 4 are respectively assigned to the upper left vertex, upper right vertex, lower left vertex and lower right vertex.

Upon receipt of the addresses sent from the vertex data address determining portion 801, the vertex data reading portion 802 reads out the data of the corresponding addresses in the vertex data memory 805. Among the read out data, the data concerning the X-coordinate value and the Y-coordinate value (i.e., vertex data) are sent to the vertex data storage 803 for bilinear interpolation together with the vertex position information. In addition, among the read out data, the vertex data reading portion 802 checks whether the upper left flag, upper right flag, lower left flag or lower right flag corresponding to the number of the vertex position information is 0 or 1. When the flag is 0, the vertex data reading portion 802 sends information that the switch address is 0 to the vertex data address determining portion 801. When the flag is 1, the vertex data reading portion 802 sends the switch address to the vertex data address determining portion 801 as the next address (reference address).

When the switch address is 0, the vertex address determining portion 801 sends the same address as the former address to the vertex data reading portion 802. When the switch address is the next address, the vertex address determining portion 801 sends the address to the vertex data reading portion 802. According to the address information sent from the vertex address determining portion 801, the vertex data reading portion 802 reads out again the data at the address in the vertex data memory 805, and sends the X-coordinate value and the Y-coordinate value at the address to the vertex data storage 803 to check whether the flag corresponding to the vertex is 0 or 1.

The above-mentioned processing performed between the vertex address determining portion 801 and the vertex data reading portion 802 is performed four times for each of the four vertexes of the focused block. For example, when the focused block is the block 3 in an image illustrated in FIG. 5B, the data at the addresses 3 and 8 in the table (illustrated in FIG. 6) in the vertex data memory 805 are read out for the vertexes 3 and 8, and the X-coordinate values and the Y-coordinate values at the addresses are sent to the vertex data storage 803. Next, the data at the addresses 26 and 27 in the vertex data memory 805 are read out, and the X-coordinate values and the Y-coordinate values at the addresses 26 and 27 are sent to the vertex data storage 803. Thus, the X-coordinate values and the Y-coordinate values are fixed as the vertex data of the vertexes 3 and 8. Thus, the discontinuous portions D1 and D2 are not formed.

The reason why the processing is repeated between the vertex address determining portion 801 and the vertex data reading portion 802 four times for each of the four vertexes of the attention block is that a vertex such as the vertex 13 (i.e., D3 in FIG. 5B) of the block 11 in the image illustrated in FIG. 5B is considered. Specifically, with respect to the vertex 13 of the block 11, the vertex data of the vertex 13 can be fixed only after performing the processing four times. The processing using the table illustrated in FIG. 6 will be described later in detail.

The vertex data storage 803 for bilinear interpolation temporarily stores the X-coordinate values and the Y-coordinate values of the pixels of the input image corresponding to the four vertexes of the focused block of the output image. Specifically, the vertex data storage 803 includes four registers corresponding to the four vertexes of a block, and overwrites the X-coordinate values and the Y-coordinate values stored in the registers using the X-coordinate values and the Y-coordinate values sent from the vertex data reading portion 802 according to the vertex position information, which is also sent from the vertex data reading portion 802. The data stored in the four registers of the vertex data storage 803 are changed when the focused block is changed to the next block.

The bilinear interpolation operating portion 804 performs a bilinear interpolation operation using the four vertex data stored in the vertex data storage 803 upon receipt of the signals VSYNC_IN and HSYNC_IN and the clock signal to sequentially determine the X-coordinate values and the Y-coordinate values of the pixels in the input image corresponding to the coordinate values of the current scanning line in the focused block of the output image, followed by sending the X-coordinate values and the Y-coordinate values as the signals X_OUT and Y_OUT, which are synchronized with the signals VSYNC_OUT and HSYNC_OUT. In this regard, the signals VSYNC_IN and HSYNC_IN and the clock signal are input to the bilinear interpolation operating portion 804 while delayed for a predetermined period of time.

As illustrated in FIG. 3A, by counting the number of edge up/edge down of the signal VSYNC_IN, the number of rising edges of the signal HSYNC_IN, and the number of clock signals, the coordinates in the output image are unambiguously determined, namely, the coordinates of the current scanning line in the focused block of the output image are determined. Meanwhile, the vertex data storage 803 for bilinear interpolation stores the X-coordinate values and the Y-coordinate values (i.e., vertex data) of the pixels in the input image corresponding to the four vertexes of the focused block of the output image. The bilinear interpolation operating portion 804 performs a bilinear interpolation operation on each of the coordinates of the current scanning line in the focused block of the output image using the four vertex data stored in the vertex data storage 803 to sequentially determine the corresponding X-coordinate values and the Y-coordinate values in the input image. Since the method of the bilinear interpolation operation is the same as that disclosed in JP2009-010730A, etc., the detailed description thereof is omitted here.

Figure 7:
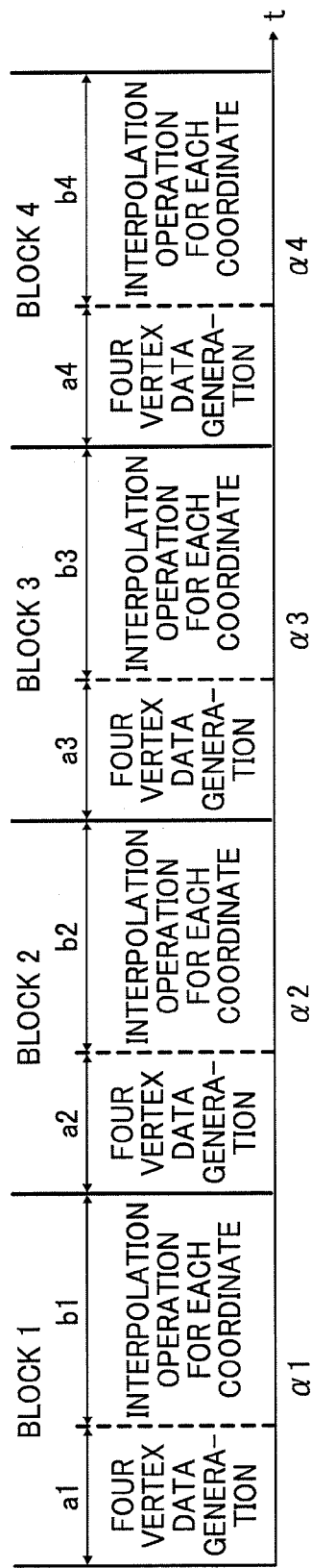
FIG. 7 is a timing chart illustrating timing of a four vertex data generation operation and an interpolation operation for each coordinate.

FIG. 7 illustrates the temporal relation between the four vertex data generation processing performed in the vertex address determining portion 801 and the vertex data reading portion 802 and the bilinear interpolation operation performed in the bilinear interpolation operating portion 804. In FIG. 7, reference character $\alpha$ ($\alpha 1$, $\alpha 2$, $\alpha 3$ and $\alpha 4$) denotes the period of raster scanning per one block, reference character a (i.e., a1, a2, a3 and a4) denotes the period of the four vertex data generation processing, and reference character b (i.e., b1, b2, b3 and b4) denotes the period of the bilinear interpolation operation. In the case illustrated in FIG. 7, the current scanning line is present on the blocks 1-4.

Referring to FIG. 7, the vertex address determining portion 801 and the vertex data reading portion 802 generate the four vertex data over a period of time a1, a2, a3 or a4 at the beginning of each of the blocks 1, 2, 3 and 4, and stores the four vertex data in the corresponding four registers of the vertex data storage 803. Next, the bilinear interpolation operating portion 804 performs interpolation operations over a period of time b1, b2, b3 or b4 using the four vertex data stored in the vertex data storage 803 to determine the X-coordinate values and the Y-coordinate values of the points in the input image corresponding to the coordinates of 160 points on the current scanning line of the block. This operation is performed on each of the scanning lines in the blocks 1-4. Similarly, the operation is also performed on each of the scanning lines in the blocks 5-8, 9-12 and 13-16.

In this regard, by using a field programmable gate array (FPGA) for the vertex address determining portion 801 and the vertex data reading portion 802, it becomes possible to perform the four vertex data generation processing at a high speed. In this case, the period of time a can be decreased so as to be negligibly small (i.e., substantially zero) compared to the period of time b.

It is possible that a work register, which is similar to the register in the vertex data storage 803, is provided in the vertex data reading portion 802 to temporarily store the data of the X-coordinate values and the Y-coordinate values obtained from the vertex data memory 805 in the work register while overwriting the data if necessary, and the finally fixed data of the X-coordinate values and the Y-coordinate values are stored in the vertex data storage 803. By using this method, the four vertex data generation processing and the bilinear interpolation operation can be performed in parallel, thereby lessening the burdens (high speed processing) on the vertex address determining portion 801 and the vertex data reading portion 802.

Figure 8:
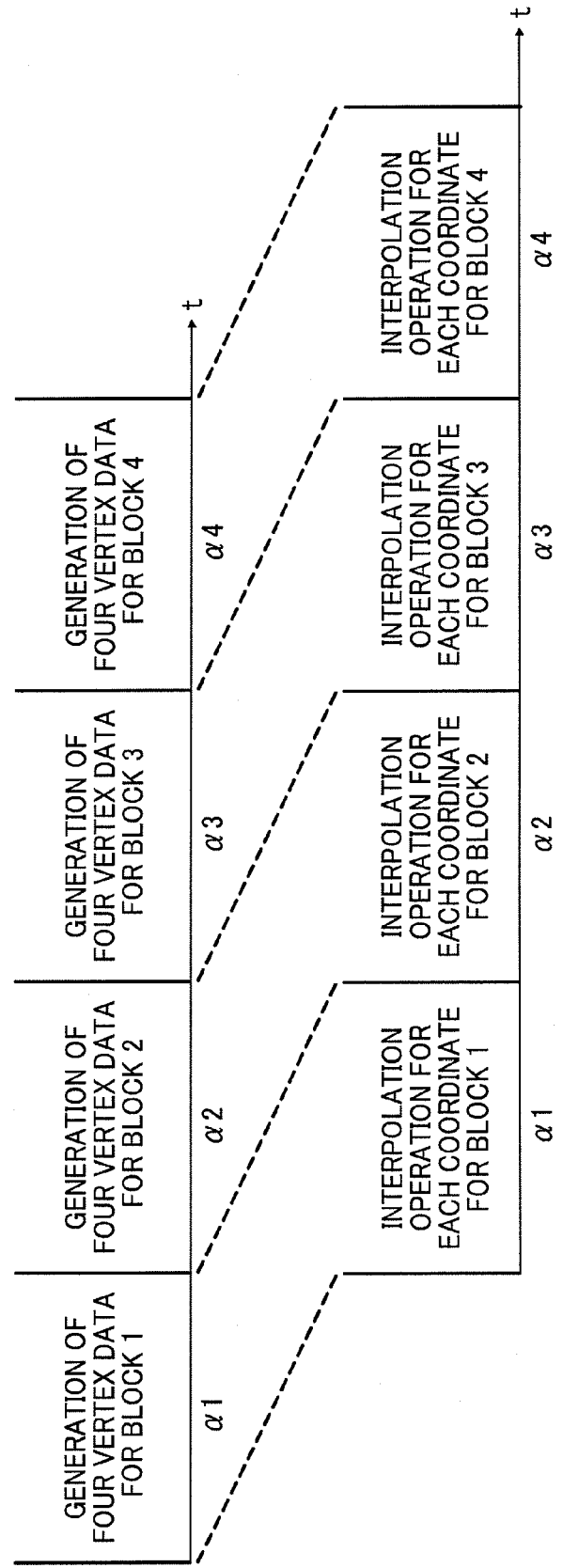
FIG. 8 is another timing chart illustrating timing of a four vertex data generation operation and an interpolation operation for each coordinate.

FIG. 8 illustrates temporal relation between the four vertex data generation processing performed in the vertex address determining portion 801 and the vertex data reading portion 802, and the bilinear interpolation operation performed in the bilinear interpolation operating portion 804. The upper portion of FIG. 8 illustrates the period of the four vertical data generation processing performed in the vertex address determining portion 801 and the vertex data reading portion 802, and the lower portion of FIG. 8 illustrates the period of the interpolation operation performed in the bilinear interpolation operating portion 804. In the case illustrated in FIG. 8, the current scanning line is present on the blocks 1-4, and reference character α (α1, α2, α3 and α4) denotes the period of raster scanning per one block. In the vertex address determining portion 801 and the vertex data reading portion 802, four vertex data of the blocks 1, 2, 3 and 4 are sequentially generated in the respective time periods α1, α2, α3 and α4, and the finally fixed vertical data are stored in the respective four registers of the vertex data storage 803. On the other hand, the interpolation operation in the bilinear interpolation operating portion 804 is started a predetermined time (α) after the processing in the vertex address determining portion 801 and the vertex data reading portion 802, and the X-coordinate values and the Y-coordinate values of the points in the input image corresponding to the coordinates of 160 points on each scanning line of each of the blocks 1-4 are determined by performing the interpolation operation over a time period α1, α2, α3 or α4 using the four vertex data stored in the vertical data storage 803.

Next, the operations of the vertex data address determining portion 801 and the vertex data reading portion 802 will be described in detail by reference to FIGS. 4-6.

In the vertex data address determining portion 801, a BLOCK_START signal (illustrated in FIG. 3B) is generated from the signals VSYNC_IN and HSYNC_IN. On the basis of the BLOCK_START signal, the time at which the vertex data stored in the vertical data storage 803 are rewritten is determined. The BLOCK_START signal rises as the signal HSYNC_IN rises, and is a signal in which one high-level clock and 159 (160-1) low-level clock are repeatedly generated.

Figure 9:
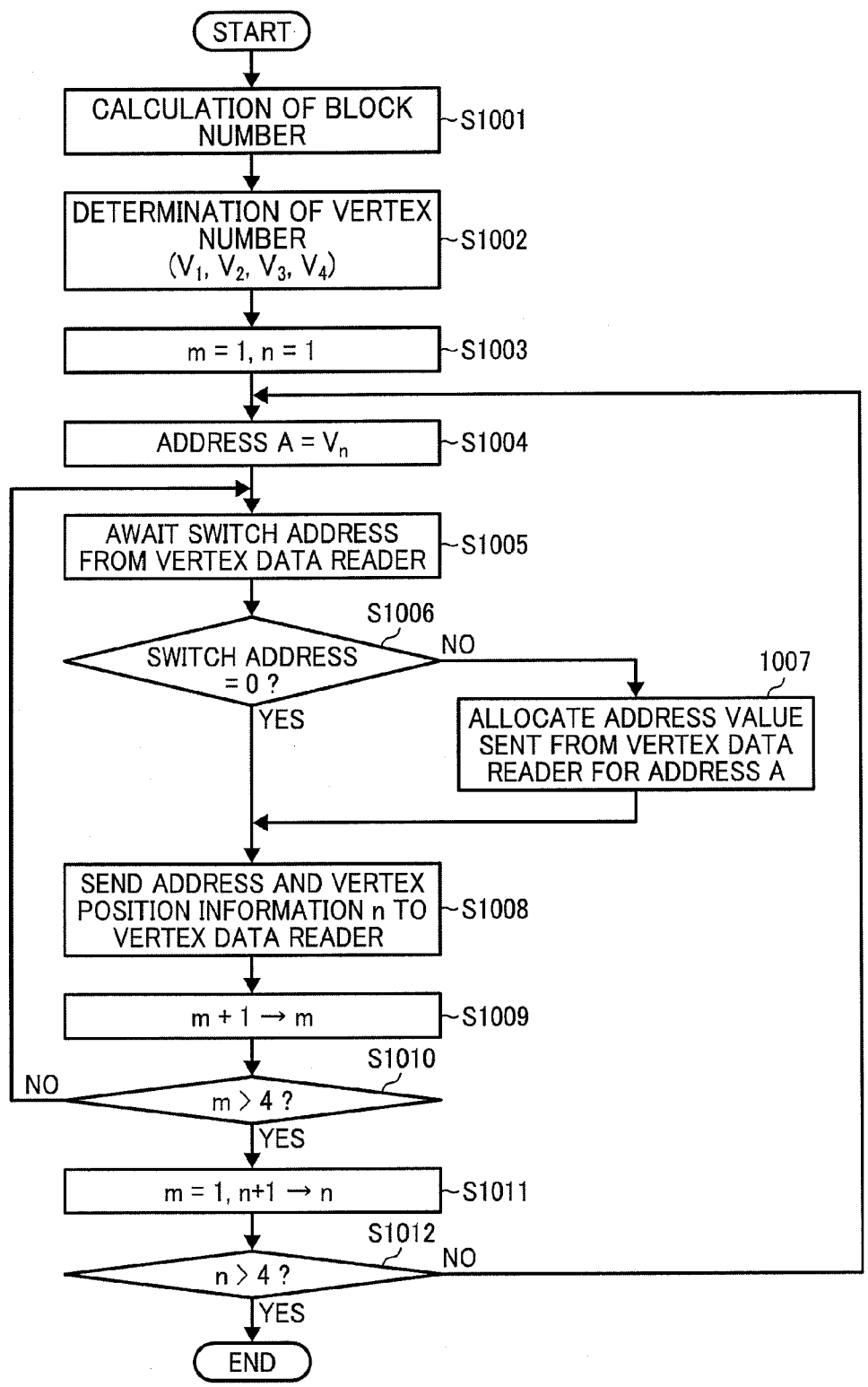
FIG. 9 is a flowchart illustrating a processing of the vertex data address determining portion illustrated in FIG. 2.

FIG. 9 is a flowchart illustrating the operation of the vertex data address determining portion 801.

In the vertex data address determining portion 801, when the rising edge of the BLOCK_START signal is detected, the number of the block is determined by calculation in Step 1001. The number of the block can be determined on the basis of the Y-coordinate value determined by counting the number of rising edges of the HSYNC_IN, and the counted number of rising edges of the BLOCK_START signal, which is initialized at every Y-coordinate determining operation. For example, when the Y-coordinate value determined by counting the number of rising edges of the HSYNC_IN is 1, the number of the block is determined to be 1 from FIG. 4. When the Y-coordinate value determined by counting the number of rising edges of the HSYNC_IN is 200 and the count of the BLOCK_START signal is 1, the number of the block is determined to be 5 from FIG. 4.

Next, the numbers of the four vertexes (i.e., $V_1$, $V_2$, $V_3$ and $V_4$) of the thus determined block are obtained in Step 1002. When the number of the block is determined, the numbers of the vertexes of the block can be determined from FIG. 4. For example, when the number of the block is 1, the numbers of the four vertexes $V_1$, $V_2$, $V_3$ and $V_4$ are determined as 1, 2, 6 and 7, respectively (i.e., $V_1$=1, $V_2$=2, $V_3$=6 and $V_4$=7), in the order of the upper left vertex, upper right vertex, lower left vertex and lower right vertex.

Next, initial setting is performed, namely, m is set to 1, and n is set to 1 (Step 1003), wherein m represents the number of operations of sending the address and vertex position information on one vertex to the vertex data reading portion 802, and n is the suffix of the number of the vertex (i.e., the vertex position information).

Next, the address A is set to $V_n$ (Step 1004), and a switch address to be sent from the vertex data reading portion 802 is awaited in Step 1005. In Step 1006, it is judged whether the switch address sent from the vertex data reading portion 802 is 0. When the switch address is 0 (YES in Step 1006), the information in which the address A is $V_n$, and the vertex position information is n is sent to the vertex data reading portion 802 (Step 1008). When the switch address is not 0, the address value sent from the vertex data reading portion 802 is allocated for the address A (Step 1007), and the address A and the vertex position information n are sent to the vertex data reading portion 802 (Step 1008). In this regard, when the vertex position information n is 1 (i.e., in first sending), Steps 1005 and 1006 are not performed, and information in which the address A is $V_n$, and the vertex position information is n is sent to the vertex data reading portion 802 without awaiting the switch address from the vertex data reading portion 802.

Next, m+1 is set for m (Step 1009), and it is judged whether m is greater than 4 (Step 1010). When m is not greater than 4, the operations of from Step 1005 to Step 1008 are repeated.

When m is greater than 4, i.e., when an operation of sending the address A and vertex position information is repeated four times, m is set to 1, and n+1 is set for n (Step 1011). In addition, when n is not greater than 4, the operation of Step 1004 is performed. These operations are also performed on the next vertex, and when n is greater 4, the processing is ended. Thus, the processing of the data address determining portion 801 for four vertexes of one block is completed.

Figure 10:
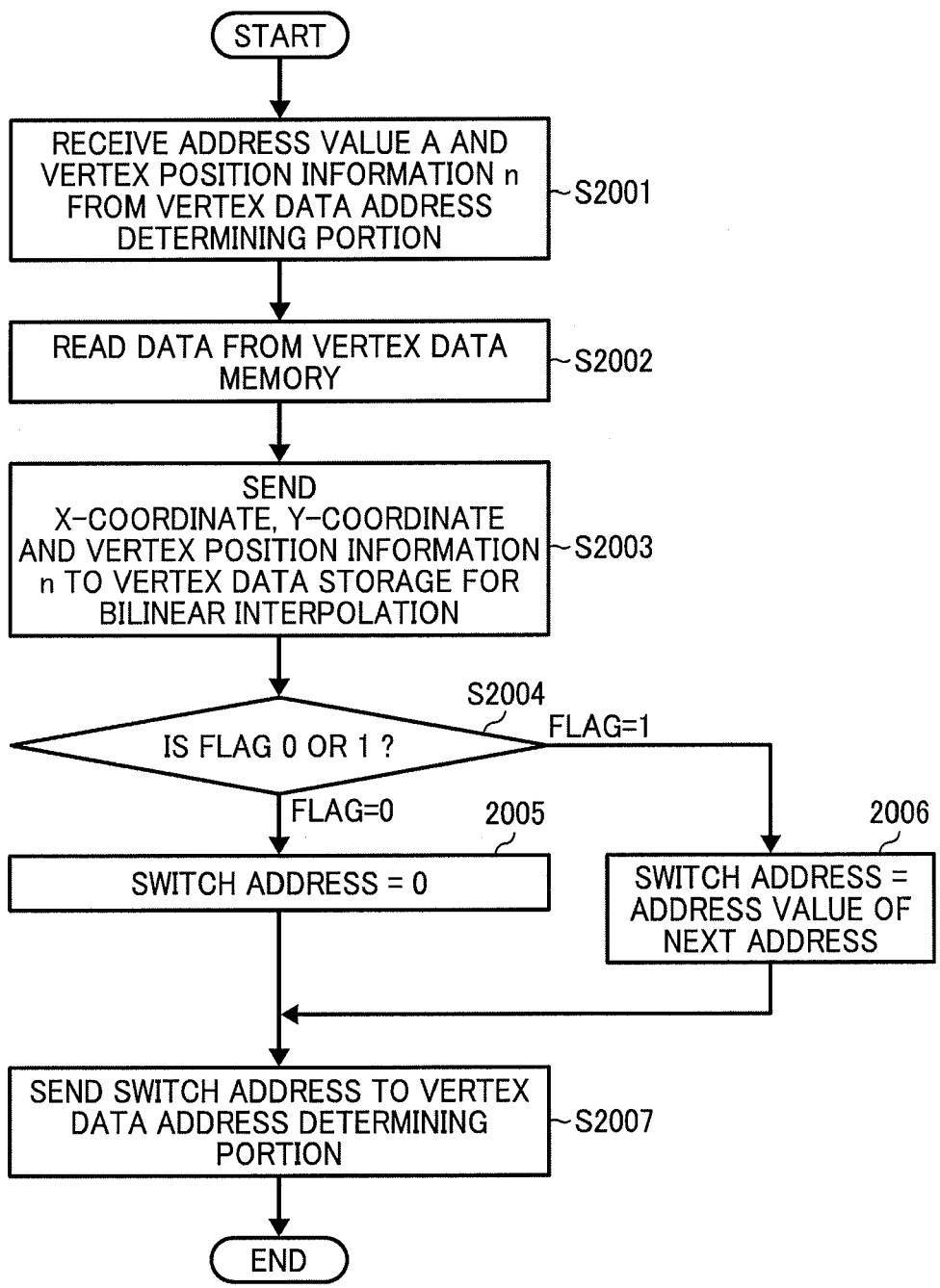
FIG. 10 is a flowchart illustrating a processing of the vertex data reading portion illustrated in FIG. 2.

FIG. 10 is a flowchart illustrating the processing of the vertex data reading portion 802.

When the vertex data reading portion 802 receives the address value A and the vertex position information n from the vertex data address determining portion 801 (Step 2001), the vertex data reading portion 802 reads out the data of the address A (X-coordinate value, Y-coordinate value, four flags, and next address) stored in the vertex data memory 805 (Step 2002). In addition, the vertex data reading portion 802 sends the read X-coordinate value and Y-coordinate value, and the vertex position information n received to the vertex data storage 803 for bilinear interpolation (Step 2003).

Next, it is checked whether the upper left flag, upper right flag, lower left flag or lower right flag in the read out data corresponding to the vertex position information n is 0 or 1 (Step 2004). For example, when the vertex position information n is 0, the upper left flag is checked. When the flag is 0, the switch flag is set to 0 (Step 2005), and when the flag is 1, the next address value in the read out data is used as the switch address (Step 2006). The thus determined switch address is sent to the vertex address determining portion 801 (Step 2007).

Thereafter, whenever the vertex data reading portion 802 receives the address value A and the vertex position information n from the vertex data address determining portion 801 (Step 2001), the operations of from Step 2002 to Step 2007 are repeated. As a result, the X-coordinate values and the Y-coordinate values (i.e., vertex data) of the four vertexes of the focused block of the output image are stored in the vertex data storage 803 for bilinear interpolation.

When the vertex data reading portion 802 receives a fourth address value for the same vertex position information n from the vertex data address determining portion 801, the vertex data reading portion 802 awaits the next information from the vertex data address determining portion 801 without performing the operations of from Step 2004 to Step 2007.

The flowchart illustrated in FIG. 10 is used for the case illustrated in FIG. 7. In the case illustrated in FIG. 8, the work register included in the vertex data reading portion 802 is used for the vertex data storage in Step 2003, and an additional step in which the finally fixed X-coordinate values and the Y-coordinate values of the four vertexes stored in the work register are transferred to the vertex data storage 803 for bilinear interpolation is performed after Step 2007.

Hereinafter, several specific processing examples will be described by reference to FIGS. 4-6. In this regard, the vertex data reading portion 802 performs the processing illustrated in FIG. 10, but the above-mentioned processing in which four vertex data are temporarily stored in a work register, and the finally fixed data of the four vertexes are transferred to the vertex data storage 803 for bilinear interpolation can also be used.

Processing Example 1

In this example, a case in which the focused block is the block 1 in the output image illustrated in FIG. 5B will be described. As illustrated in FIG. 4, the numbers of the four vertexes of the block 1 are 1, 2, 6 and 7 (i.e., $V_1=1$, $V_2=2$, $V_3=6$ and $V_4=7$).

(1) Processing for Vertex 1

The vertex data address determining portion 801 sends address information, address $A=V_1=1$, and vertex position information, n=1, to the vertex data reading portion 802. The vertex data reading portion 802 reads out the data of the address 1 stored in the vertex data memory 805 (i.e., the table illustrated in FIG. 6) and sends the X-coordinate value (X1) and the Y-coordinate value (Y1) to the vertex data storage 803. In addition, the vertex data reading portion 802 checks the upper left flag corresponding to the vertex position information (n=1). Since the upper left flag is 0 in the table illustrated in FIG. 6, the vertex data reading portion 802 sends information that the switch address is 0 to the vertex data address determining portion 801.

Upon receipt of the switch address information, the vertex data address determining portion 801 again sends the address information, address $A=V_1=1$, and the vertex position information, n=1, to the vertex data reading portion 802. In addition, the vertex data reading portion 802 again reads out the data of the address 1 stored in the vertex data memory 805.

The following processings are omitted here. As a result, the same processing is repeated four times in each of the vertex data address determining portion 801 and the vertex data reading portion 802, and the vertex data of the vertex 1 of the block 1 are fixed at X1 and Y1.

(2) Processing for Vertex 2

The vertex data address determining portion 801 sends address information, address $A=V_2=2$, and vertex position information, n=2, to the vertex data reading portion 802. The vertex data reading portion 802 reads out the data of the address 2 stored in the vertex data memory 805 and sends the X-coordinate value (X2) and the Y-coordinate value (Y2) to the vertex data storage 803. In addition, the vertex data reading portion 802 checks the upper right flag corresponding to the vertex position information (n=2). Since the upper right flag is 0 in the table illustrated in FIG. 6, the vertex data reading portion 802 sends information that the switch address is 0 to the vertex data address determining portion 801.

Upon receipt of the switch address information, the vertex data address determining portion 801 again sends the address information, address $A=V_2=2$, and the vertex position information, n=2, to the vertex data reading portion 802. In addition, the vertex data reading portion 802 again reads out the data of the address 2 stored in the vertex data memory 805.

The following processings are omitted here. As a result, the same processing is repeated four times in each of the vertex data address determining portion 801 and the vertex data reading portion 802, and the vertex data of the vertex 2 of the block 1 are fixed at X2 and Y2.

(3) Processing for Vertex 6

The vertex data address determining portion 801 sends address information, address $A=V_3=6$, and vertex position information, n=3, to the vertex data reading portion 802. The vertex data reading portion 802 reads out the data of the address 6 stored in the vertex data memory 805. Since the lower left flag corresponding to the vertex position information (n=3) is also 0 in this case, each of the vertex data address determining portion 801 and the vertex data reading portion 802 performs the same processing four times, and as a result the vertex data of the vertex 6 of the block 1 are fixed at X4 and Y4.

(4) Processing for Vertex 7

The vertex data address determining portion 801 sends address information, address $A=V_4=7$, and vertex position information, n=4, to the vertex data reading portion 802. The vertex data reading portion 802 reads out the data of the address 7 stored in the vertex data memory 805. Since the lower right flag corresponding to the vertex position information (n=4) is also 0 in this case, each of the vertex data address determining portion 801 and the vertex data reading portion 802 performs the same processing four times, and as a result the vertex data of the vertex 7 of the block 1 are fixed at X5 and Y5.

Processing Example 2

In this example, a case in which the focused block is the block 3 in the output image illustrated in FIG. 5B will be described. As illustrated in FIG. 4, the numbers of the four vertexes of the block 3 are 3, 4, 8 and 9 (i.e., $V_1=3$, $V_2=4$, $V_3=8$ and $V_4=9$).

(1) Processing for Vertex 3

The vertex data address determining portion 801 sends address information, address $A=V_1=3$, and vertex position information, n=1, to the vertex data reading portion 802. The vertex data reading portion 802 reads out the data of the address 3 stored in the vertex data memory 805 (i.e., the table illustrated in FIG. 6) and sends the X-coordinate value (X3) and the Y-coordinate value (Y3) to the vertex data storage 803. In addition, the vertex data reading portion 802 checks the upper left flag corresponding to the vertex position information (n=1). Since the upper left flag is 1 in the table illustrated in FIG. 6, the vertex data reading portion 802 sends the next address (i.e., 26) to the vertex data address determining portion 801 as the switch address.

Upon receipt of the switch address information, the vertex data address determining portion 801 performs a second processing, in which the address information, address A=26, and the vertex position information, n=1, are sent to the vertex data reading portion 802. The vertex data reading portion 802 reads out the data of the address 26 stored in the vertex data memory 805, and sends the X-coordinate value (X10) and the Y-coordinate value (Y10) to the vertex data storage 803. In addition, the vertex data reading portion 802 checks the upper left flag corresponding to the vertex position information (n=1). Since the upper left flag corresponding to the vertex position information (n=1) is 0, the vertex data reading portion 802 sends information that the switch address is 0 to the vertex data address determining portion 801.

Upon receipt of the information, the vertex data address determining portion 801 performs a third processing, in which the same address information, address A=26, and vertex position information, n=1, are sent to the vertex data reading portion 802 as the third processing. The vertex data reading portion 802 again reads out the data of the address 26 stored in the vertex data memory 805, and performs the same processing as the second processing.

The vertex data address determining portion 801 performs a fourth processing, in which the same address information, address A=26, and vertex position information, n=1, which are the same as those in the third processing, are sent to the vertex data reading portion 802. The vertex data reading portion 802 again reads out the data of the address 26 stored in the vertex data memory 805, and performs the same processing as the third processing.

As a result, by performing four processings in each of the vertex data address determining portion 801 and the vertex data reading portion 802, the vertex data of the vertex 3 of the block 3 are changed from X3 and Y3 to X10 and Y10, and are finally fixed at X10 and Y10. Thus, the discontinuous portion D1 illustrated in FIG. 5B is not formed.

(2) Processing for Vertex 4

The vertex data address determining portion 801 sends address information, address $A=V_2=4$, and vertex position information, n=2, to the vertex data reading portion 802. The vertex data reading portion 802 reads out the data of the address 4 stored in the vertex data memory 805. Description of the following processing is omitted here. Since the upper right flag corresponding to the vertex position information (n=2) is also 0 in this case, each of the vertex data address determining portion 801 and the vertex data reading portion 802 performs the same processing four times, and as a result the vertex data of the vertex 4 of the block 3 are fixed at X11 and Y11.

(3) Processing for Vertex 8

The vertex data address determining portion 801 sends address information, address $A=V_3=8$, and vertex position information, n=3, to the vertex data reading portion 802. The vertex data reading portion 802 reads out the data of the address 8 stored in the vertex data memory 805, and sends the X-coordinate value (X6) and the Y-coordinate value (Y6) to the vertex data storage 803. In addition the vertex data reading portion 802 checks the lower left flag corresponding to the vertex position information (n=3). Since the lower left flag is 1 in the table illustrated in FIG. 6, the vertex data reading portion 802 sends the next address (i.e., 27) to the vertex data address determining portion 801 as the switch address.

Upon receipt of the switch address information, the vertex data address determining portion 801 performs a second processing in which the address information, address A=27, and the vertex position information, n=3, are sent to the vertex data reading portion 802. The vertex data reading portion 802 reads out the data of the address 27 stored in the vertex data memory 805, and sends information of the X-coordinate value (X13) and the Y-coordinate value (Y13) to the vertex data storage 803. In addition, the vertex data reading portion 802 checks the lower left flag corresponding to the vertex position information (n=3). Since the lower left flag corresponding to the vertex position information (n=3) is 0, the vertex data reading portion 802 sends information that the switch address is 0 to the vertex data address determining portion 801.

The vertex data address determining portion 801 performs a third processing in which the address information, address A=27, and vertex position information, n=3, which are the same as those in the second processing, are sent to the vertex data reading portion 802. The vertex data reading portion 802 again reads out the data of the address 27 stored in the vertex data memory 805, and performs the same processing as the second processing.

The vertex data address determining portion 801 performs a fourth processing in which the address information, address A=27, and vertex position information, n=3, which are the same as those in the third processing, are sent to the vertex data reading portion 802. The vertex data reading portion 802 again reads out the data of the address 27 stored in the vertex data memory 805, and performs the same processing as the third processing.

As a result, by performing four processings in each of the vertex data address determining portion 801 and the vertex data reading portion 802, the vertex data of the vertex 8 of the block 3 are changed from X6 and Y6 to X13 and Y13, and are finally fixed at X13 and Y13. Thus, there is no problem about the discontinuous portion D2 (illustrated in FIG. 5B).

(4) Processing for Vertex 9

The vertex data address determining portion 801 sends address information, address $A=V_4=9$, and vertex position information, n=4, to the vertex data reading portion 802. The vertex data reading portion 802 reads out the data of the address 9 stored in the vertex data memory 805. Description of the following processing is omitted here. Since the lower right flag corresponding to the vertex position information (n=4) is also 0 in this case, each of the vertex data address determining portion 801 and the vertex data reading portion 802 performs the same processing four times, and as a result the vertex data of the vertex 9 of the block 3 are fixed at X14 and Y14.

Processing Example 3

In this example, a case in which the attention block is the block 11 in the output image illustrated in FIG. 5B will be described. As illustrated in FIG. 4, the numbers of the four vertexes of the block 11 are 13, 14, 18 and 19 (i.e., $V_1=13$, $V_2=14$, $V_3=18$ and $V_4=19$).
(1) Processing for Vertex 13
The vertex data address determining portion 801 sends address information, address $A=V_1=13$, and vertex position information, n=1, to the vertex data reading portion 802. The vertex data reading portion 802 reads out the data of the address 13 stored in the vertex data memory 805 (i.e., the table illustrated in FIG. 6) and sends the X-coordinate value (X9) and the Y-coordinate value (Y9) to the vertex data storage 803. In addition, the vertex data reading portion 802 checks the upper left flag corresponding to the vertex position information (n=1). Since the upper left flag is 1 in the table illustrated in FIG. 6, the vertex data reading portion 802 sends the next address (i.e., 28) to the vertex data address determining portion 801 as the switch address.

Upon receipt of the switch address information, the vertex data address determining portion 801 performs a second processing in which the address information, address A=28, and the vertex position information, n=1, are sent to the vertex data reading portion 802. The vertex data reading portion 802 reads out the data of the address 28 stored in the vertex data memory 805, and sends information of the X-coordinate value (X16) and the Y-coordinate value (Y16) to the vertex data storage 803. In addition, the vertex data reading portion 802 checks the upper left flag corresponding to the vertex position information (n=1). Since the upper left flag corresponding to the vertex position information (n=1) is 1, the vertex data reading portion 802 sends information that the switch address is the next address 31 to the vertex data address determining portion 801.

Upon receipt of the switch address information, the vertex data address determining portion 801 performs a third processing in which the address information, address A=31, and vertex position information, n=1, are sent to the vertex data reading portion 802. The vertex data reading portion 802 reads out the data of the address 31 stored in the vertex data memory 805, and sends the information of the X-coordinate value (X21) and the Y-coordinate value (Y21) to the vertex data storage 803. In addition, the vertex data reading portion 802 checks the upper left flag corresponding to the vertex position information (n=1). Since the upper left flag corresponding to the vertex position information (n=1) is 1, the vertex data reading portion 802 sends information that the switch address is the next address 32 to the vertex data address determining portion 801.

Upon receipt of the switch address information, the vertex data address determining portion 801 performs a fourth processing in which the address information, address A=32, and vertex position information, n=1, are sent to the vertex data reading portion 802. The vertex data reading portion 802 reads out the data of the address 32 stored in the vertex data memory 805, and sends the information of the X-coordinate value (X28) and the Y-coordinate value (Y28) to the vertex data storage 803. Thus, the processing for n=1 is ended.

As a result, by performing four processings in each of the vertex data address determining portion 801 and the vertex data reading portion 802, the vertex data of the vertex 13 of the block 11 are changed as follows:
X9, Y9→X16, Y16→X21, Y21→X28, Y28.
Thus, the vertex data are finally fixed at X28 and Y28, and the discontinuous portion D3 illustrated in FIG. 5B is not formed.
(2) Processing for Vertex 14
The vertex data address determining portion 801 sends address information, address $A=V_2=14$, and vertex position information, n=2, to the vertex data reading portion 802. The vertex data reading portion 802 reads out the data of the address 14 stored in the vertex data memory 805 (i.e., the table illustrated in FIG. 6) and sends information of the X-coordinate value (X17) and the Y-coordinate value (Y17) to the vertex data storage 803. In addition, the vertex data reading portion 802 checks the upper right flag corresponding to the vertex position information (n=2). Since the upper right flag is 1 in the table illustrated in FIG. 6, the vertex data reading portion 802 sends the next address (i.e., 33) to the vertex data address determining portion 801 as the switch address.

Upon receipt of the switch address information, the vertex data address determining portion 801 performs a second processing in which the address information, address A=33, and the vertex position information, n=2, are sent to the vertex data reading portion 802. The vertex data reading portion 802 reads out the data of the address 33 stored in the vertex data memory 805, and sends information of the X-coordinate value (X29) and the Y-coordinate value (Y29) to the vertex data storage 803. In addition, the vertex data reading portion 802 checks the upper right flag corresponding to the vertex position information (n=2). Since the upper right flag corresponding to the vertex position information (n=2) is 0, the vertex data reading portion 802 sends information that the switch address is 0 to the vertex data address determining portion 801.

Upon receipt of the switch address information, the vertex data address determining portion 801 performs a third processing in which the address information, address A=33, and the vertex position information, n=2, which are the same as those in the second processing, are sent to the vertex data reading portion 802. The vertex data reading portion 802 again reads out the data of the address 33 stored in the vertex data memory 805, and performs the same processing as the second processing.

Next, the vertex data address determining portion 801 performs a fourth processing in which the address information, address A=33, and the vertex position information, n=2, which are the same as those in the third processing, are sent to the vertex data reading portion 802. The vertex data reading portion 802 again reads out the data of the address 33 stored in the vertex data memory 805, and performs the same processing as the third processing.

As a result, by performing four processings in each of the vertex data address determining portion 801 and the vertex data reading portion 802, the vertex data of the vertex 14 of the block 11 are changed from X17 and Y17 to X29 and Y29. Thus, the vertex data are finally fixed at X29 and Y29, and a discontinuous portion D4 illustrated in FIG. 5B is not formed.
(3) Processing for Vertex 18
The vertex data address determining portion 801 sends address information, address $A=V_3=18$, and vertex position information, n=3, to the vertex data reading portion 802. The vertex data reading portion 802 reads out the data of the address 18 stored in the vertex data memory 805 (i.e., the table illustrated in FIG. 6) and sends information of the X-coordinate value (X24) and the Y-coordinate value (Y24) to the vertex data storage 803. In addition, the vertex data reading portion 802 checks the lower left flag corresponding to the vertex position information (n=3). Since the lower left flag is 1 in the table illustrated in FIG. 6, the vertex data reading portion 802 sends the next address (i.e., 35) to the vertex data address determining portion 801 as the switch address.

Upon receipt of the switch address information, the vertex data address determining portion 801 performs a second processing in which the address information, address A=35, and the vertex position information, n=3, are sent to the vertex data reading portion 802. The vertex data reading portion 802 reads out the data of the address 35 stored in the vertex data memory 805, and sends information of the X-coordinate value (X31) and the Y-coordinate value (Y31) to the vertex data storage 803. In addition, the vertex data reading portion 802 checks the lower left flag corresponding to the vertex position information (n=3). Since the lower left flag corresponding to the vertex position information (n=3) is 0, the vertex data reading portion 802 sends information that the switch address is 0 to the vertex data address determining portion 801.

Upon receipt of the switch address information, the vertex data address determining portion 801 performs a third processing in which the address information, address A=35, and the vertex position information, n=3, which are the same as those in the second processing, are sent to the vertex data reading portion 802. The vertex data reading portion 802 again reads out the data of the address 35 stored in the vertex data memory 805, and performs the same processing as the second processing.

Next, the vertex data address determining portion 801 performs a fourth processing in which the address information, address A=35, and the vertex position information, n=3, which are the same as those in the third processing, are sent to the vertex data reading portion 802. The vertex data reading portion 802 again reads out the data of the address 35 stored in the vertex data memory 805, and performs the same processing as the third processing.

As a result, by performing four processings in each of the vertex data address determining portion 801 and the vertex data reading portion 802, the vertex data of the vertex 18 of the block 11 are changed from X24 and Y24 to X31 and Y31. Thus, the vertex data are finally fixed at X31 and Y31, and a discontinuous portion D5 illustrated in FIG. 5B is not formed.

(4) Processing for Vertex 19

The vertex data address determining portion 801 sends address information, address A=V₄=19, and vertex position information, n=4, to the vertex data reading portion 802. The vertex data reading portion 802 reads out the data of the address 19 stored in the vertex data memory 805. Description of the following processing is omitted here. Since the lower right flag corresponding to the vertex position information (n=4) is 0 in this case, each of the vertex data address determining portion 801 and the vertex data reading portion 802 performs the same processing four times, and as a result the vertex data of the vertex 19 of the block 11 are fixed at X32 and Y32.

Hereinbefore, the vertex data determination processing for the blocks 1, 3 and 13 of the output image (P by P image) illustrated in FIG. 5B corresponding to the input image illustrated in FIG. 5A have been described as examples. The vertex data determination processing for other blocks can also be determined similarly.

In this regard, the data structure of the vertex data memory 805 is not limited to that illustrated in FIG. 6.

Figure 11A:
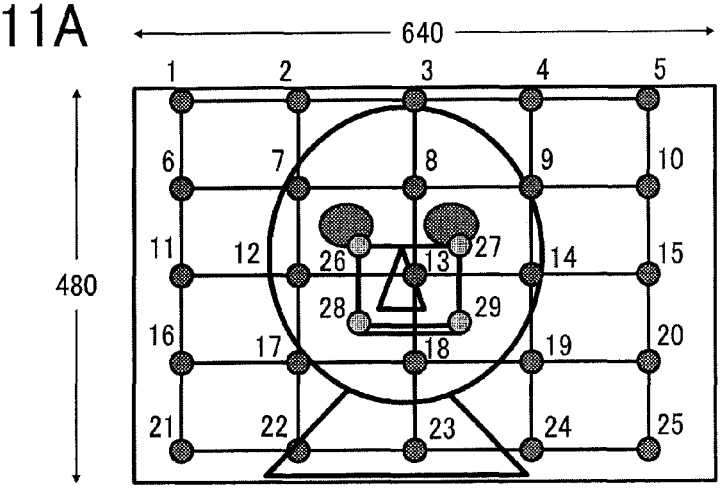
FIGS. 11A-11C are schematic views illustrating an input image and output P in P images.
Figure 11B:
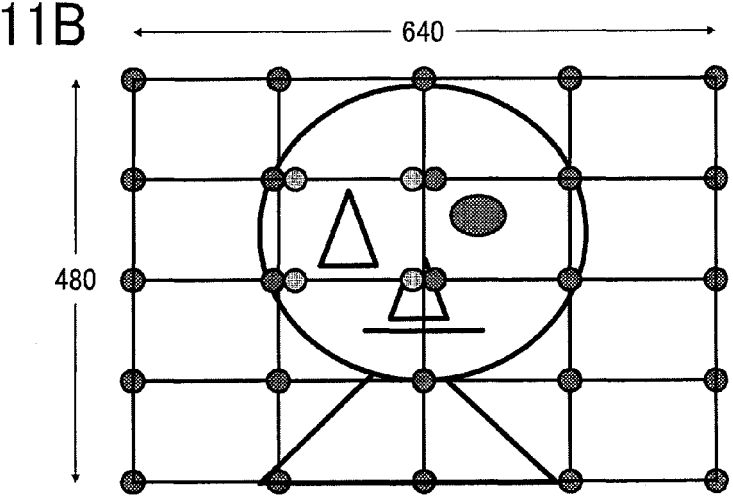

FIG. 12 illustrates an example of data stored in the vertex data memory 805 in another example in which an output image (Picture in Picture image) illustrated in FIG. 11B is obtained from an input image illustrated in FIG. 11A.

Addresses 1-25 in the table illustrated in FIG. 12 correspond to the numbers of the vertexes illustrated in FIG. 4 similarly to the table FIG. 6. Addresses 26-29 are used for storing the data of overlapping vertexes at the discontinuous portion. The number (i) of Xi and Yi in the table means the number (1-25) assigned to the vertexes of the input image illustrated in FIG. 11A. Since the image size is also 640×480 in this example, the X coordinate value is from 1 to 640 and the Y-coordinate value is from 1 to 480. The meaning of the upper left flag, upper right flag, lower left flag and lower right flag is the same as that in the table illustrated in FIG. 6.

Although the processings of the vertex data determining portion 801 and the vertex data reading portion 802 in this example are the same as those in the above-mentioned example, at most two processings are repeated for one vertex in this example illustrated in FIG. 11B.

Figure 11C:
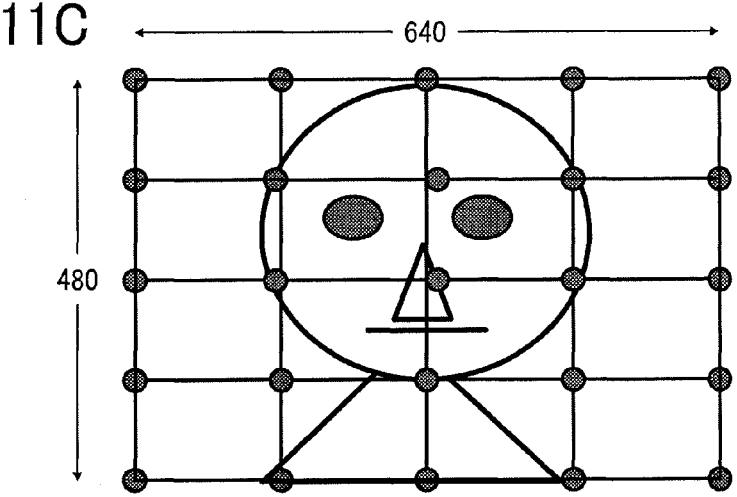
Figure 13:
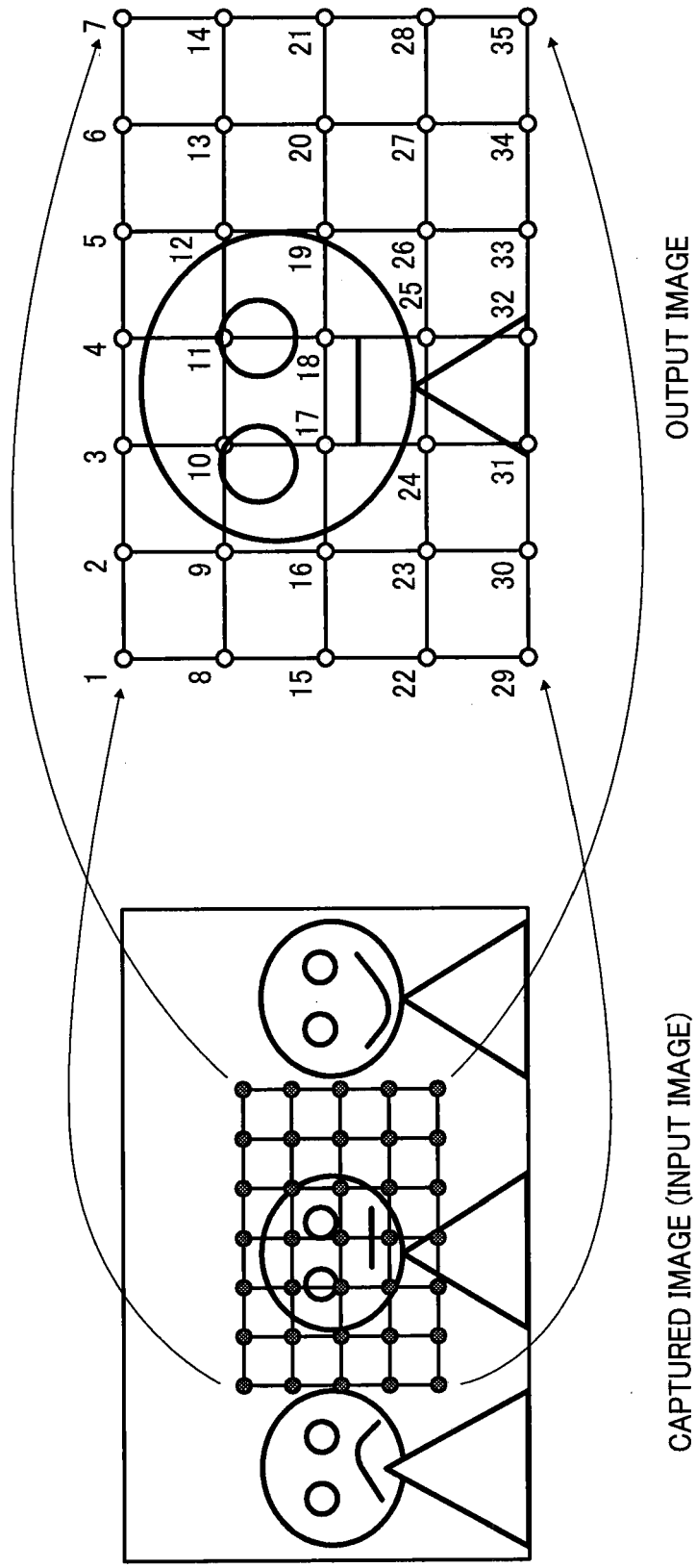
FIG. 13 is a schematic view illustrating relation between an input image and an enlarged image of a portion of the input image.
Figure 14B:
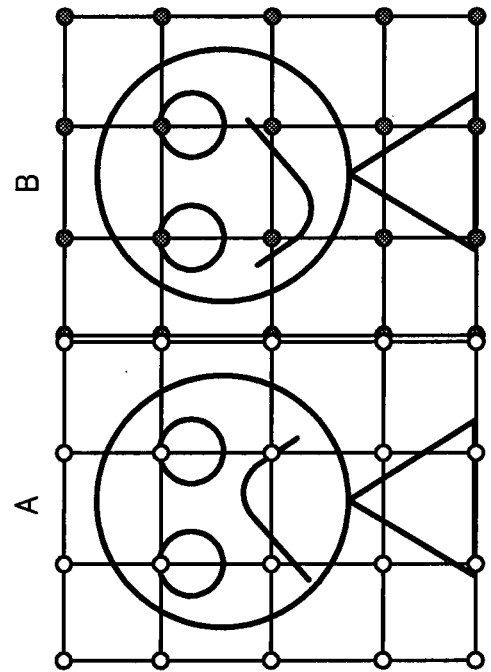
FIGS. 14A and 14B are schematic views illustrating an input image and an output P by P image.
Figure 14A:
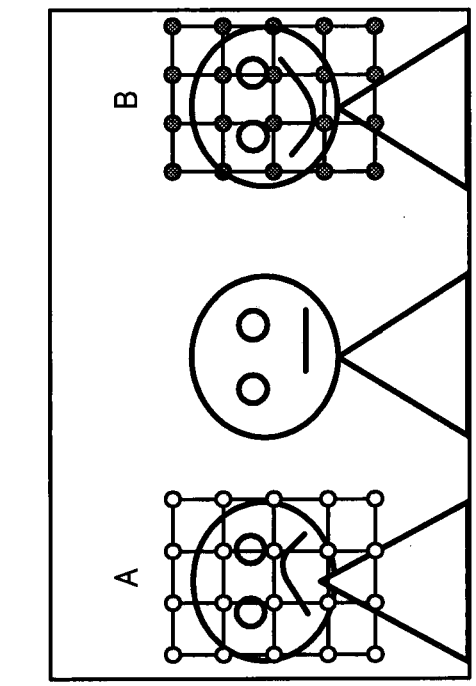

In this regard, if all the upper left flag, upper right flag, lower left flag and lower right flag are neglected (i.e., if all the flags are 0), the output image illustrated in FIG. 11C can be obtained. Namely, the table illustrated in FIG. 12 can play a dual role, resulting in saving of tables.

In general, a variety of tables (lookup tables) are stored in the vertex data memory so as to be used for various kinds of image transformation, and a proper table is selected therefrom on an instruction from outside.

It is possible for the image transformer 80 illustrated in FIG. 2 that the vertex data determining portion 801 sends the firstly determined address to the vertex data reading portion 802 together with the vertex position information, and then the vertex data reading portion 802 repeatedly reads out the data stored in the vertex data memory 805 as many times as needed on the basis of the flag and the next address to determine the vertex data of each vertex. Using this method makes it possible to perform the information transmission operation between the vertex data determining portion 801 and the vertex data reading portion 802 only once.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2010-008185, filed on Jan. 18, 2010, the entire contents of which are herein incorporated by reference.

What is claimed is:

1. An image processing method for converting an input image to a transformed output image consisting of multiple pixels, comprising:
  segmenting the transformed output image into multiple blocks each having multiple pixels including multiple vertex pixels;
  determining a coordinate value in the input image corresponding to one of the multiple vertex pixels of a focused block of the multiple blocks by reference to a vertex data memory, which stores at least one coordinate value in the output image for each of the multiple vertex pixels of each of the multiple blocks and in which two or more coordinate values are stored for at least one of the multiple vertex pixels of at least one of the multiple blocks, wherein when two or more coordinate values are stored for the one of the vertex pixels, one of the multiple coordinate values is selected;
  repeating the coordinate value determining step for all of the multiple blocks to determine coordinate values in the input image corresponding to the multiple vertex pixels of the multiple blocks of the transformed output image; and determining coordinate values in the input image for all of the multiple pixels of the multiple blocks by performing an interpolation processing using the coordinate values for all of the multiple vertex pixels of the multiple blocks.

2. The image processing method according to claim 1, wherein the two or more coordinate values for at least one of the multiple vertex pixels of at least one of the multiple blocks are stored in different addresses in the vertex data memory.

3. The image processing method according to claim 2, wherein each of the addresses in the vertex data memory stores data including one coordinate value in the input image, a reference address to another coordinate value, and a flag indicating validity or invalidity of the reference address.

4. The image processing method according to claim 3, wherein the flag includes four flags corresponding to an upper left vertex pixel, an upper right vertex pixel, a lower left vertex pixel and a lower right vertex pixel of the multiple vertex pixels in each of the multiple blocks.

5. The image processing method according to claim 3, wherein the first-mentioned coordinate value determining step includes:

reading out data at an address of one of the multiple vertex pixels of the focused block in the vertex data memory;

selecting the coordinate value at the address, when the flag at the address indicates that the reference address is invalid; and reading out data at the reference address to select the coordinate value at the reference address, when the flag at the address indicates that the reference address is valid.

6. The image processing method according to claim 5, wherein the step of reading data at the reference address includes:

reading data at the reference address, when the flag at the reference address indicates that the reference address is valid; and repeating the step of reading data at the reference address until the flag indicates that the reference address is invalid.

7. The image processing method according to claim 5, wherein when the output image is a predetermined image, the coordinate value in the read out data at the address is selected while neglecting the flag in the read out data.

8. The image processing method according to claim 1, the multiple vertex pixels of the focused block being four vertex pixels, wherein the second-mentioned coordinate value determining step includes:

sequentially selecting four coordinate values in the input image corresponding to the four vertex pixels of the focused block to temporarily store the coordinate values in a vertex data storage for interpolation operation; and determining coordinate values in the input image corresponding to all of the multiple pixels in the focused block by performing an interpolation operation using the coordinate values stored in the vertex data storage for interpolation operation.

9. The image processing method according to claim 8, wherein the step of sequentially selecting four coordinate values and the step of determining coordinate values are performed in parallel.

10. An image processing device for converting an electric input image to a transformed output image consisting of multiple pixels, comprising:

an A/D converter configured to convert the electric input image to digital image data;

an image buffer configured to store the digital image data;

a synchronization signal generator configured to generate horizontal synchronization signal, a vertical synchronization signal and a clock signal;

an image transformer configured to determine coordinate values in the input image corresponding to all of the multiple pixels of the transformed output image using the image processing method according to claim 1; and an image reader configured to read the digital image data stored in the image buffer by reference to the coordinate values determined by the image processing device to form the transformed output image.

11. An imaging apparatus for converting an optical image to a transformed output image, comprising:

an imaging sensor configured to convert the optical image to analogue electric signals; and the image processing device according to claim 10 configured to convert the analogue electric signals to the transformed output image.

* * * * *